Sept. 9, 1958 N. J. ROSEN ET AL 2,851,327
PRESSURE OPERATED, MOTOR DRIVEN RECORDER AND PUNCH THEREFOR
Filed Jan. 10, 1955 2 Sheets-Sheet 1
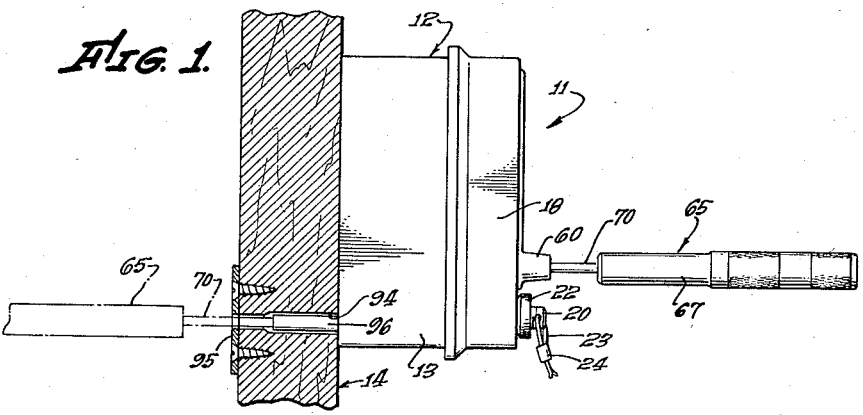
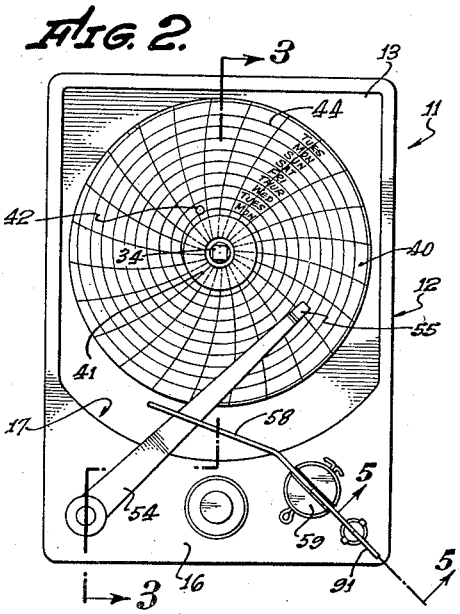
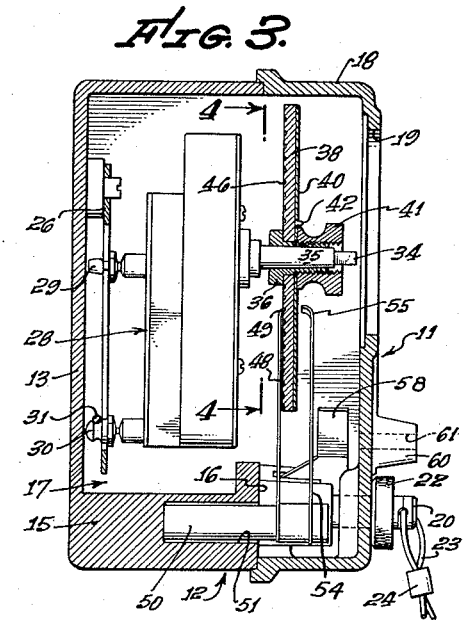
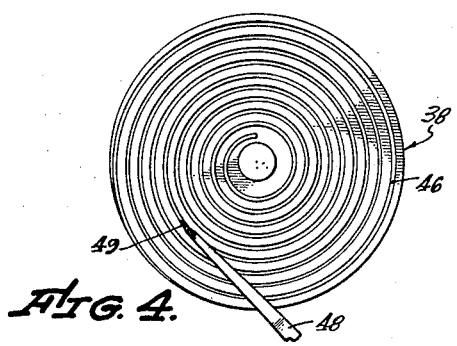
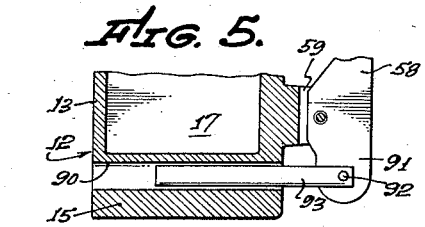
NORMAN J. ROSEN,
EDMUND A. FALSTRAULT,
INVENTORS.
BY THEIR ATTORNEYS.
HARRIS, KIECH, FOSTER & HARRIS.

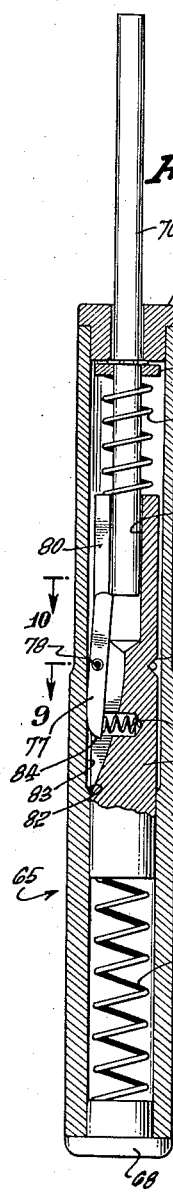

United States Patent Office 2,851,327
Patented Sept. 9, 1958

2,851,327

PRESSURE OPERATED, MOTOR DRIVEN RECORDER AND PUNCH THEREFOR

Norman J. Rosen, Altadena, and Edmund A. Falstrault, Azusa, Calif., assignors, by mesne assignments, to Chicago Telephone of California, Inc., Pasadena, Calif., a corporation of California Application January 10, 1955, Serial No. 480,917

7 Claims. (Cl. 346—79)

This invention relates to recorders and particularly to pressure operated, motor driven recorders and means for operating same. It will be particularly exemplified as applied to a recording clock which can be actuated periodically by a watchman upon periodic check-up trips to a station at which the recording clock may be installed.

Present systems for recording check-up trips of a watchman to each of a plurality of stations are costly and subject to tampering to give false records. The present invention makes it possible to install a relatively inexpensive recorder at each station, the watchman carrying an actuating device such as an automatic punch which is used to make a mark on a multi-day record indicative of the time the recorder was actuated. The invention includes among its objects the provision of such a system and such a recorder.

A further object of the invention is to provide a pressure operated recorder which will operate by clockwork or other drive means for a plurality of days without servicing and yet be small, simple and inexpensive to produce.

Another object of this invention is to provide in a recorder as described a record chart in disk form and an improved cam means to produce a multi-turn spiral record on the chart.

Another object of the invention is to provide a recorder which can be actuated from opposite sides of a supporting wall or door making it possible to record on a recorder within a building from a position outside the structure or room.

Another object of this invention is to provide an automatic punch which delivers a blow of predetermined magnitude and which, when used in conjunction with the recorder, is limited in the maximum force which can be applied to the recording mechanism.

Other objects and advantages of the invention and various features of construction thereof will become apparent to those skilled in the art upon reference to the following specification and the accompanying drawings wherein certain embodiments of the invention are illustrated.

In the drawings:

Fig. 1 is a side elevation illustrating the invention mounted against a wall or door, with two positions of an automatic punch which may be used to effect a recording by actuation of the device from either side of the wall or door;

Fig. 2 is a front elevation with the cover removed;

Fig. 3 is a sectional view along the line 3—3 of Fig. 2;

Fig. 4 is a fragmentary sectional view along the line 4—4 of Fig. 3, illustrating the follower arm engaged with the spiral groove of the turntable or disk;

Fig. 5 is a fragmentary sectional view along the line 5—5 of Fig. 2, illustrating the rod provided for operation of the recorder from the rear;

Fig. 6 is a sectional view along the axis of an automatic punch of the invention, here shown in the "start" position;

Fig. 7 is a similar view with the punch at the "trip" position;

Fig. 8 is a similar view with the punch in the "hammer" position;

Fig. 9 is a cross section of the punch along the line 9—9 of Fig. 6; and

Fig. 10 is a cross section of the punch along the line 10—10 of Fig. 6.

Referring particularly to Figs. 1-3, the invention includes a recorder 11 having a case 12 with a base section 13 suitably secured to a wall or door 14 by means not shown. One wall 15 of the base section is thickened and provides a shelf 16 at the lower side of a chamber 17. The case 12 includes a flanged cover 18 having a glass-covered opening 19. The cover 18 is removably connected to the base section 13 by any suitable means, shown as a stud 20 carried by the base section and extending through the cover 18 to receive a threaded thumb-nut 22 which clamps the cover in place and which prevents removal of the cover without severance of a sealing means shown as a wire 23 extending through the stud with its ends connected by a seal 24 applied by authorized personnel.

Detachably mounted in the chamber 17 on a mounting ring 26 is a drive means shown as a clockwork 28. The mounting is preferably such as will permit the clockwork 28 to be removed from the chamber 17 by a mere outward pressure and may include pins 29 locking within openings of the ring 26 when another pin 30 slips under a detent spring 31 detachably holding the clockwork in position.

The clockwork 28 is of conventional construction and includes a winding stem 34 having a squared end fitting a key that may be retained within the chamber 17. Surrounding the stem 34 is a tapered tubular drive member 35 turning, for example, one revolution each 24 hours. A tapered sleeve 36 frictionally engages the drive member 35. A turntable shown in the form of a molded disk 38 of plastic material such as Bakelite, and a record member or chart 40 are removably clamped against a shoulder of the sleeve 36 of the clockwork 28 by a thumb screw 41. This connection permits the disk 38 to be connected to the sleeve 36 in any angular position. On the front surface of the disk 38 there is an indexing pin 42 which coincides with and extends through a hole in the record chart 40, thereby providing a method of indexing the record chart to the disk 38.

The record chart 40 used in the invention as illustrated is made from a pressure-sensitive paper which produces a mark when pressure is applied by a pressure member without the transfer of a marking material from a stylus. Such pressure-sensitive papers are known in the art. A spiral line 44 is preferably printed or otherwise placed on the face of the record chart 40 and desirably is indexed by being divided in each of its turns into 24 divisions indicative of hours of the day and preferably distinctive of a. m. and p. m. periods. A seven-turn spiral thus provides space for making a record of a complete week. In Fig. 2, the record chart 40 is shown with provision for nine revolutions of recording, suitable for keeping a record including a complete week and two adjacent days, such as holidays.

As shown in Figs. 3 and 4, the surface of the disk 38 opposite to the record chart 40 provides a cam means shown as a spiral groove 46 corresponding in shape to the spiral line 44 on the record chart 40. A follower arm 48 forms a part of a substantially U-shaped structure and provides a follower tip 49 which rides in the groove in the disk 38. This follower arm 48 is preferably of spring material so that the tip 49 is held resiliently in the groove 46. However, this force is light enough to permit movement of the follower tip 49 laterally from one turn of the groove to another by hand when adjusting the mechanism.

The follower arm 48 is rigidly attached to a shaft 50 which pivots freely in an opening 51 of the wall 15. This opening is preferably positioned radially beyond the disk 38 so that the locus of motion of the tip 49 is along a line passing through the axis of rotation of the disk 38. A resilient stylus arm 54 forms a part of the substantially U-shaped structure and is rigidly attached to the shaft 50. This stylus arm terminates in a chart-marking or pressure member 55 which normally does not engage the record chart 40 with sufficient pressure to create a mark. In the preferred embodiment of the invention, the chart-marking member 55 has a chisel-shaped tip disposed at ninety degrees to the spiral line 44. The rotation of the disk 38 drives the follower arm 48, rotates the shaft 50, and positions the pressure member 55 of the stylus arm 54 relative to the spiral line 44, all as a function of time, as determined by the operation of the clockwork 28.

To actuate the stylus arm 54 for the purpose of pressing the pressure member 55 briefly against the record chart 40 to produce an indication, the following elements are illustrated by way of example. An actuating lever 58 is pivoted between bifurcations 59 of the case 12 in a position to overlie the stylus arm 54 in any operative position of the latter. An intermediate portion of this lever 58 is disposed in alignment with a hole 61 in a boss 60 of the cover 18. An end portion of the lever 58 overlies the stylus arm 54 while the latter traverses the face of the record chart 40. The invention contemplates that a suitable pressure-creating tool shall be inserted through the hole 61 and brought into contact with the actuating lever 58 to contact and deflect the stylus arm 54, resulting in an indication on the record chart 40. By noting the position of the indication relative to the turn and fraction of a turn of the spiral line 44 across which the indication line appears, one can determine the time at which the indication was made. If desired, the shape of the pressure-creating tool may be keyed to an irregular shape of the hole 61, although the subsequent discussion will assume merely a round hole and a round pressure-creating tool.

If the force transmitted to the stylus arm 54 is too light, no mark will be left on the record chart; if the force transmitted is too strong, damage to the various elements may result. This problem is taken care of by so relating the dimensions and disposition of the record chart 40, stylus arm 54, lever 58 and cover 18 that a force of predetermined magnitude applied through the hole 61 will be within the operating range discussed above. This force is preferably applied through the action of an automatic punch 65. In addition, the boss 60 projects from the cover 25 a specific distance such that it prevents the punch delivering a force greater than the impact of predetermined magnitude, previously referred to. This is accomplished by using a punch constructed substantially as follows:

The preferred punch 65 is shown in Figs. 6–10 and is non-adjustable in the impact blow it delivers when in use or, if adjustable, it is permanently set so as to deliver a blow of substantially uniform impact each time it is actuated. This punch is shown as including a tubular shell 67 closed by end members 68 and 69, the latter having an opening through which extends a pressure-creating tool shown as an impact plunger 70 having its inner end extending into a socket 71 of a hammer 72 slidable in the shell 67. Compressed between the end member 68 and the hammer 72 is a main spring 73. A return spring 74 is compressed between the opposite end of the hammer 72 and a washer 75 fixed against outward displacement on the plunger 70.

If the main spring 73 is completely compressed, it no longer would function as a spring but as a solid element interconnecting the shell 67 and the hammer 72, in which event there would be no limit to the pressure transmittable to the lever 58 by the plunger 70 when inserted in the hole 61. The invention provides means for preventing such complete compression of the main spring 73 and for controlling the blow delivered. Such means preferably releases the hammer 72 to deliver a predetermined percussive blow to the plunger 70 just before the end member 69 comes into contact with the face of the boss 60, whereby this contact limits further pressure of the plunger 70 on the lever 58 due to additional compression of the main spring 73, and prevents the main spring from being completely compressed.

These results are attained in the illustrated structure by use of a latch 77 pivoted on a split wire ring 78 in a circular groove 79 of the hammer 72. The latch 77 is positioned in a longitudinal slot 80 of the hammer 72 and provides a forward end normally bearing against the inner end of the plunger, as shown in Fig. 6, to cause the plunger 70 and hammer 72 to retract as a unit against the action of the main spring 73 as the tubular shell 67 is advanced toward the case 12. The resulting pressure on the lever 58 is usually sufficient to move the pressure member 55 into light contact with the pressure-sensitive chart 40. This pressure is maximized, however, by engagement of the other end of the latch 77 with a sloping annular cam surface 82 provided inside the shell 67 at the end of a counterbore 83 thereof. This other end of the latch 77 preferably provides a beveled surface 84 engageable with the surface 82 to tip the latch 77 against the action of a latch spring 85 to move its forward end out of engagement with the end of the plunger 70, thus permitting the hammer 72 to advance under the action of the main spring 73 to engage the end of the plunger 70, see Fig. 8, and deliver thereto a percussive blow determined by the compression of the main spring 73 at the time of release of the hammer. The automatic punch 65 is designed to produce a percussive blow sufficient to form a definite, easily-legible mark on the pressure-sensitive chart 40 but insufficient to damage the mechanism. Such a mark is usually distinguishable from a mark made by the unauthorized pressing of some other plunger element through the hole 61. When using the punch shown, the manual force employed cannot deliver a pressure greater than that from the quick percussive hammer blow. Any continued manual force toward the case 12 is resisted by the boss 60 which acts as a stop means for the tubular shell 67 of the punch.

Thus it is seen that the magnitude of the impact delivered by the punch is determined by its design and construction and is not under the control of the party operating it. To change the magnitude, the characteristics of the main spring 73 and/or the return spring 74 may be modified, or the dimensions of the components of the punch may be varied to change the amount of compression of the main spring 73 or the travel of the hammer element 72 after release by the latch 77, or the mass of the hammer element 72 may be altered.

Another feature of the invention is that it can be actuated either from the front or back of the case 12. To permit the latter, an opening 90 completely traverses the wall 15 at a position outwardly beyond the bifurcations 59. A rear portion 91 of the actuating lever 58 is pivoted by a pin 92 to a shaft 93 sliding smoothly in the opening 90. This shaft may be of a length to be actuated by the punch 65 when its plunger is pressed into contact with the shaft end when the plunger is inserted through a hole 94 of the wall or door 14 to which the case 12 is secured, the punch engaging an escutcheon plate 95 acting like the boss 60 to limit the pressure that can be applied. Preferably, however, the shaft 93 terminates within the hole 94 and is actuated by a pressure-transmitting idler member 96 (Fig. 1) positioned within an enlarged portion of the hole 94 and of appropriate length to deliver the above-described maximized pressure and percussive force to the actuating lever 58 before the punch engages the plate 95, even though the pressure is here applied in a direction opposite to that first described. This is made possible by providing portions on opposite sides of the pivot for such actuating lever 58 for receiving pressure from the plunger 70 of the punch.

By the described construction, a watchman may actuate the same recorder from either of two stations physically separated from each other by a door or wall. One station can be outside the building structure in which is located the interior station, thus minimizing the number of recorders required for a given number of recording stations.

In view of the fact that variations from the specific structure herein disclosed may be made by those skilled in the art, it is intended to protect all such forms as fall within the scope of the patent claims.

We claim as our invention:

1. In a recording device for recording periodic events on a record chart in a spiral path, the combination of: a disk providing a spiral cam means formed directly thereon, and corresponding in shape to said spiral path, said disk providing a chart-receiving surface; means for rotating said disk; a follower arm having a follower tip; means for mounting said follower arm to move toward and away from the axis of rotation of said disk, said follower tip engaging said cam means; a flexible stylus arm fixed to and synchronously movable with said follower arm and providing a chart-marking portion normally spaced from said chart; and an actuating member overlying said stylus arm and movable into contact therewith at a location spaced from said chart-marking portion to displace said chart-marking portion into marking engagement with said chart.

2. In a recording device for recording periodic events on a record chart, the combination of: a case; means for moving said record chart within said case; a stylus arm providing a chart-marking member normally spaced from said chart; an actuating member and means for pivoting same to move toward and away from said stylus arm, said actuating member having a first portion on one side of said pivoting means overlying said stylus arm to bring said chart-marking member into marking engagement with said chart when said actuating member is pivoted in a given direction about said pivoting means; and means for thus pivoting said actuating member selectively from opposite sides of said case.

3. A recording device as defined in claim 2 in which said last-named means includes openings extending through said case in different directions, said actuating member providing a second portion to the other side of said pivoting means, said openings respectively overlying said first and second portions of said actuating member.

4. In a recording device for recording periodic events on a pressure-sensitive record chart, the combination of: a drive unit; a disk driven rotatably by said drive unit, said disk having a spiral groove on one side thereof and a chart-receiving surface on the other side thereof; means for attaching said record chart to said disk; a follower arm riding in said spiral groove; a marking stylus; means for coupling said marking stylus to said follower arm for positioning of said marking stylus by said follower arm; an automatic punch delivering an impact of predetermined magnitude; and means for pressing said marking stylus into marking contact with said chart in response to such impact of said punch.

5. A recording device as defined in claim 4 including stop means engageable by said automatic punch to limit movement of said punch toward said pressing means and the pressure exertable on said marking stylus by said punch.

6. A recording device for recording periodic events on a pressure-sensitive chart by use of an automatic punch of the type having a shell and a plunger delivering a percussive blow when pressed a predetermined distance into said shell, said recording device including: a case providing an opening for such plunger; a disk in said case providing a chart-receiving surface and means for detachably connecting such pressure-sensitive chart thereto; means for rotating said disk; an actuating member opposite said opening to be engaged by said plunger and receive a percussive blow therefrom; a chart-marking member operatively connected to said actuating member and pressing against said chart in marking relation in response to such percussive blow; and a stop means in alignment with said opening for engaging said shell of said automatic punch immediately after said percussive blow has been transmitted to said actuating member.

7. A recording device as defined in claim 6 in which said stop means includes a boss extending from said case around said opening, said boss providing a face engageable with the shell of said punch.

References Cited in the file of this patent

UNITED STATES PATENTS

| | | |
|---|---|---|
| 520,310 | Hepp | May 22, 1894 |
| 910,630 | Young | Jan. 26, 1909 |
| 1,080,306 | Silliman | Dec. 2, 1913 |
| 1,089,246 | Menns | Mar. 3, 1914 |
| 1,373,204 | Phelps | Mar. 29, 1921 |
| 1,378,152 | Tidd | May 17, 1921 |
| 1,405,236 | Lewis et al. | Jan. 31, 1922 |
| 1,572,046 | Seiler | Feb. 9, 1926 |
| 2,246,003 | Rich | June 17, 1941 |
| 2,594,901 | Forster | Apr. 29, 1952 |